March 31, 1942.  E. TRACHSEL  2,277,859
BRAKE
Filed Aug. 31, 1940

INVENTOR
ERNST TRACHSEL
BY Hammond & Littell
ATTORNEYS

Patented Mar. 31, 1942

2,277,859

UNITED STATES PATENT OFFICE 2,277,859

BRAKE

Ernst Trachsel, Zurich, Switzerland, assignor of sixty per cent to Walter Huessy, Aarburg, Switzerland Application August 31, 1940, Serial No. 354,930

7 Claims. (Cl. 188—79.5)

The present invention relates to brakes and more particularly to self-adjusting means for compensating for the wear of the break shoes in use.

The invention has for an object to provide an improved brake mechanism wherein the length of path of operative movement will be substantially constant as the brake shoes wear in use.

In its preferred embodiment the invention provides means for limiting the retractile movement of the brake shoes which means is automatically adjustable to compensate for wear of the brake shoes but in which provision is made to prevent the improper operation of the adjusting devices which might otherwise occur when parts of the brake assembly are subject to changes in temperature.

The embodiment more particularly described herein for the purposes of illustrating the principles of the invention comprises means which can be readily applied to brake assemblies of known types without the necessity for extensive redesign of the brake assembly as a whole. The mechanism is of few parts simple in construction, certain in operation and it will not readily get out of order.

Figure 1:
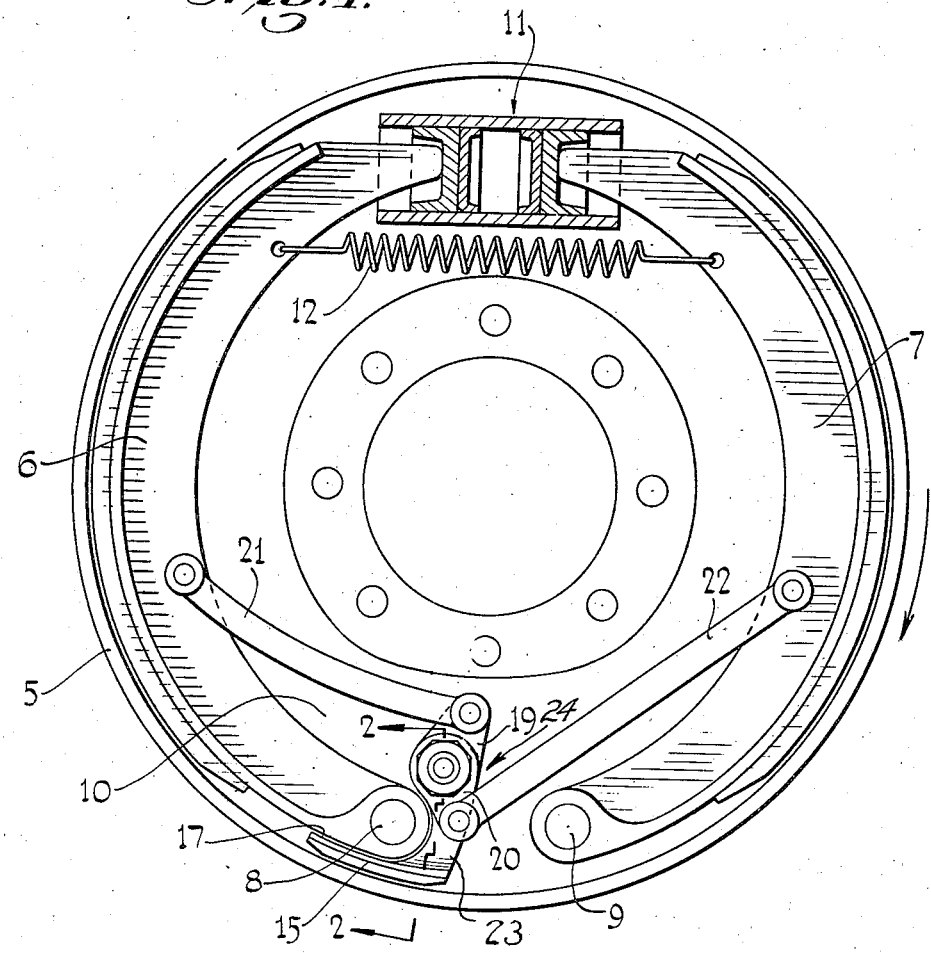

The nature and objects of the invention will be better understood from a description of an illustrative embodiment thereof for the purposes of which description reference should be had to the accompanying drawing forming a part hereof and in which Figure 1 is an elevation, partly in section, of a brake assembly embodying the principles of the invention.

Figure 2:
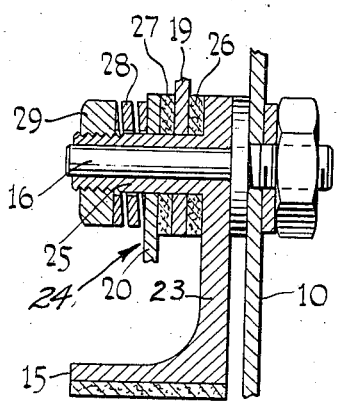

Fig. 2 is a sectional view taken on the line 2—2 of Fig. 1.

In the brake assembly shown in the drawing for the purposes of illustration a brake drum 5 is in operation engaged by a pair of brake shoes 6 and 7 pivoted respectively at 8 and 9 in a brake back plate 10 or other suitable support. The brake shoes are shown as actuated by a hydraulic device conventionally indicated at 11 against the tension of a spring 12 which normally holds the brake shown in retracted position.

The invention provides in its preferred embodiment self-adjusting mechanism for limiting the retractile movement of the brake shoes in order that the path of movement for braking may always be sufficient and may never be excessive as the brake shoes, or the linings thereof, wear during use. As the brake shoes move in their braking movement further toward the brake drum because of wear the mechanism is automatically adjusted so that the retractile movement remains constant even after considerable wear. In order that improper adjustment may be avoided a feeler member sensitive to expansion of the brake drum due to heat or wear is provided and the adjustment is controlled jointly by movement of the brake shoes and of the feeler member.

In the structure shown an arm carrying a feeler member 15 is pivoted on the stud bolt 16 fixed in the back plate or other relatively fixed support for movement toward and from the brake drum. This feeler member is provided with a lining designed to resist wear but preferably not designed to provide high frictional engagement with the brake drum. The movement of the feeler member in radially outward direction will be limited by its engagement with the surface of the brake drum and will therefore be greater when the drum is expanded by heat or when the inner surface of the drum is worn by long use. The movement of the feeler member radially inward will, in the structure shown, be limited by engagement of its toe 17 with the brake shoe 6. The brake shoe 6 in its retracted position will lie somewhat closer to the brake drum after long wear and therefore the retracted movement of the feeler member will be less than when all parts are new. This arrangement provides, to some extent, compensation for wear when the lining of the feeler member and the lining of the brake shoe are both worn.

The retractile movement of the brake shoes is limited by adjustable connections which cooperate with the feeler member. The feeler member arm has adjustably connected thereto, preferably on the same pivot center, two arms 19 and 20 to which respectively are connected links 21 and 22, which in turn are connected to the brake shoes 6 and 7. As shown in Fig. 2 the arm of the feeler member is freely pivoted on the bolt 16 suitably secured in the back plate and is formed with a sleeve 25 on which the arms 19 and 20 are frictionally mounted. Friction disks 26 and 27 are mounted between the relatively movable parts and a spring 28 and adjusting nut 29 provide for adjusting the frictional resistance to relative movement of the three arms, that is to say the arm of the feeler member and the two arms which control the retractile movement of the brake shoes.

In use the nut 29 is so adjusted that the friction of the elements is too great to be overcome by the spring 12 drawing the brake shoes inward but not great enough to resist substantially the outward movement of the brake shoes when actuated outward by the hydraulic device 11. If desired the friction disk 27 may be splined to the sleeve 25 to afford a certain independence of operation of the arms 19 and 20.

The two arms 19 and 20 with the arm 23 of the feeler member constitute a three-part lever 24 in the nature of a bell crank lever in which the several arms are adjustably connected and the force of resistance to relative movement can be adjusted to suit the requirements of operation by the nut 29. The resistance to adjustment is frictional and so far as the construction is concerned movement in both directions is resisted frictionally only, and the resistance is the same in both directions. Obviously this particular arrangement normally satisfies the requirements of operation but obviously the invention is in no sense limited to this particular arrangement for providing the desired adjustability.

It is to be noted that the feeler arm controls the movement of the feeler member toward and from the brake drum and the movement of the arm in turn is limited by the limited movement of the feeler member. The other arms 19 and 20 of the three part lever are connected to the brake shoes 6 and 7 to limit the retractile movement thereof and on occasion to be moved with sufficient force by the outward movement of the break shoes to force readjustment of the adjustable elements. It is to be noted that there is a certain measure of differential action in the connections. The movement of both the brake shoes and the feeler member may be relatively small and adjustment may take place. On the other hand movements of the shoes may be relatively large but if the movement of the feeler member is also correspondingly large no adjustment will occur.

It is to be noted that the three part lever is supported by the back plate for pivotal movement. In the structure shown it is pivoted directly on the back plate but while the arrangement shown is preferred as simple it may be modified to suit requirements of manufacture.

In operation braking movement of either or both of the brake shoes outward will, through the connections shown, move the feeler member outward. If, because of wear of one or both of the brake shoe linings, the movement of the brake is excessive as compared with the movement of the member feeler outward the feeler member will engage the brake drum whereby a stop is provided and upon further movement of the brake shoes a readjustment of one or both of the arms 19, 20, will be made against the frictional resistance of the device. Upon reverse movement of the parts, as the brake shoes are drawn together by the spring 12, the links 21 and 22 will limit the inward retractile movement of the brake shoes when the inward movement of the feeler member is stopped by engagement of the toe 17 with the brake shoe 6. As above explained the movement of the arms 19 and 20 is limited because the friction of the device is too great to be overcome by the tension of the spring 12.

If however the greater outward movement of the brake shoes is due to enlargement of the diameter of the drum due to heat-caused expansion then the feeler member will similarly have greater outward movement and prevent adjustment of the arms.

The foregoing particular description is illustrative merely and it is not intended as defining the limits of the invention.

What is claimed is:

1. In a brake assembly, the combination with a brake drum, a brake back plate, and a brake shoe connected to the back plate and movable toward and from the brake drum, of a feeler member movable toward and from the brake drum, a lever device mounted on the back plate for pivotal movement relative to the back plate having one arm controlling the movement of the feeler member and another arm operatively connected to the brake shoe to limit the retractile movement thereof, the two arms being adjustably connected to be reset when the movement of the brake shoe toward the brake drum as the result of wear is excessive as compared with the movement of the feeler member toward the brake drum.

2. In a brake assembly the combination with a brake drum, a brake back plate, and a pair of brake shoes each movable toward and from the brake drum, of a feeler member connected to the back plate and movable toward and from the brake drum, a three arm lever device pivoted on the back plate, one arm controlling the movement of the feeler member, the other arms being connected one to each brake shoe and limiting the retractile movement thereof, and means normally resisting relative movement of the arms but yieldable to permit relative angular adjustment thereof upon application of excessive force at least when applied by movement of a brake shoe toward the drum.

3. A brake assembly as defined in claim 2 wherein either brake shoe connected arm can be reset by force applied by excessive movement of its brake shoe independently of the other brake shoe connected arm.

4. In a brake assembly the combination with a brake drum, a brake back plate, and a pair of brake shoes each movable toward and from the brake drum, of a feeler member connected to the back plate and movable toward and from the brake drum, a three arm lever device pivoted on the back plate, one arm controlling the movement of the feeler member, the other arms being connected one to each brake shoe and limiting the retractile movement thereof, and friction means holding said arms in relatively adjusted position.

5. In a brake assembly the combination with a brake drum, a brake back plate, and a pair of brake shoes each movable toward and from the brake drum, of a feeler member movable toward and from the brake drum, and connecting mechanism between the brake shoes and the feeler member for limiting the retractile movement of the brake shoe including a three arm lever device the arms of which are severally connected to the brake shoes and the feeler member and adjustably connected to each other.

6. In a brake assembly the combination with a brake drum, a brake back plate, and a pair of brake shoes each movable toward and from the brake drum, of a feeler member movable toward and from the brake drum, and connecting mechanism between the brake shoes and the feeler member including a lever device the arms of which are frictionally connected and adjustable relative to each other under stress when movement of the brake shoes is excessive due to wear as compared with the movement of the feeler member.

7. In a brake assembly the combination of a brake drum, a brake back plate, a pair of brake shoes mounted on the brake back plate spaced from each other at their ends and movable toward and from the brake drum, a three-arm lever device pivoted on the back plate, two arms of which are connected one to each brake shoe, the other arm of which extends between the ends of the brake shoes, and a feeler member carried by said arm and movable toward and from the brake drum, and friction means normally holding said arms in adjusted relation but permitting readjustment of the arms relative to each other when movement of either brake shoe is excessive as compared with the movement of the feeler member.

ERNST TRACHSEL.